United States Patent
Chen et al.

(10) Patent No.: US 8,964,658 B2
(45) Date of Patent: Feb. 24, 2015

(54) METHODS OF CONTENTION-BASED TRANSMISSION

(75) Inventors: Yih-Shen Chen, Hsinchu (TW);
Chia-Chun Hsu, Taipei (TW);
Chih-Yuan Lin, Wujie Township, Yilan County (TW); Pei-Kai Liao, Mingjian Xiang (TW)

(73) Assignee: Mediatek Inc. (TW)

(*) Notice: Subject to any disclaimer, the term of this patent is extended or adjusted under 35 U.S.C. 154(b) by 256 days.

(21) Appl. No.: 13/065,797

(22) Filed: Mar. 30, 2011

(65) Prior Publication Data
US 2011/0243080 A1  Oct. 6, 2011

Related U.S. Application Data

(60) Provisional application No. 61/319,330, filed on Mar. 31, 2010.

(51) Int. Cl.
*H04W 4/00* (2009.01)
*H04W 74/08* (2009.01)
*H04W 72/04* (2009.01)
*H04W 72/12* (2009.01)

(52) U.S. Cl.
CPC ...... *H04W 74/0841* (2013.01); *H04W 72/0453* (2013.01); *H04W 72/0466* (2013.01); *H04W 72/1284* (2013.01)
USPC .......... 370/329; 370/318; 370/330; 370/344; 370/475; 370/491

(58) Field of Classification Search
None
See application file for complete search history.

(56) References Cited

U.S. PATENT DOCUMENTS

| 7,782,810 B2* | 8/2010 | Han et al. ............... 370/318 |
| 2008/0316961 A1* | 12/2008 | Bertrand et al. ........... 370/329 |
| 2009/0109919 A1* | 4/2009 | Bertrand et al. ........... 370/330 |

(Continued)

FOREIGN PATENT DOCUMENTS

| WO | WO2007087842 A1 | 8/2007 |
| WO | WO2009116789 A1 | 9/2009 |
| WO | WO2010145520 A1 | 12/2010 |

OTHER PUBLICATIONS

International Search Report and Written Opinion of International Search Authority for PCT/CN2011/072357 dated Jul. 7, 2011 (13 pages).

(Continued)

*Primary Examiner* — Willie J Daniel, Jr.
(74) *Attorney, Agent, or Firm* — Zheng Jin

(57) ABSTRACT

A method for contention-based (CB) uplink transmission in a wireless communication network is provided. A base station (eNB) first transmits CB configuration information and CB grant to a user equipment (UE). The UE derives a plurality of transmission opportunities from the uplink CB grant and in response transmits uplink CB data via one of the transmission opportunities. The UE then receives an acknowledgment from the serving base station. If the uplink CB data is non-decodable by the eNB due to multiple contention UEs, then the UE retransmits the uplink data in response to a negative acknowledgment. In one novel aspect, the uplink transmission radio resource carriers both the uplink CB data and UE-selected signature information. In one embodiment, the UE-selected signature information is transmitted via pilot tones. By eliminating a separate phase of contention resolution, the overall latency of CB transmission is reduced and transmission efficiency is improved.

23 Claims, 6 Drawing Sheets

(56) References Cited

U.S. PATENT DOCUMENTS

| | | |
|---|---|---|
| 2009/0116434 A1 | 5/2009 | Lohr et al. ............... 370/329 |
| 2009/0207791 A1 | 8/2009 | Nakatsugawa ............ 370/329 |
| 2009/0316631 A1 | 12/2009 | Kato et al. ............... 370/328 |
| 2010/0220666 A1 | 9/2010 | Imamura et al. .......... 370/329 |
| 2011/0128928 A1* | 6/2011 | Lin et al. .................. 370/329 |
| 2011/0292895 A1* | 12/2011 | Wager et al. ............. 370/329 |
| 2012/0014269 A1* | 1/2012 | Ray et al. ................. 370/252 |
| 2012/0275381 A1* | 11/2012 | Kim et al. ................. 370/328 |

OTHER PUBLICATIONS

Sesia et al. (LTE—The UMTS Long Term Evolution). John Wiley & Sons, Ltd. Feb. 17, 2009 pp. 377-381, 421-426, Figs. 17.3, 19.1, Online ISBN: 9780470742891.

SIPO, the First Examination Opinion of CN application 201180004545.4, dated Aug. 16, 2013, full text (6 pages).

JPO, the Office Action of JP application 2012-556375 dated Oct. 1, 2013 (4 pages).

Lilian Sunna; Contention-Based Uplink Transmission in Unscheduled Access; Jan. 15, 2010 (pp. 95).

* cited by examiner

METHODS OF CONTENTION-BASED TRANSMISSION

CROSS REFERENCE TO RELATED APPLICATIONS

This application claims priority under 35 U.S.C. §119 from U.S. Provisional Application No. 61/319,330, entitled "Methods of Contention-Based Transmission," filed on Mar. 31, 2010, the subject matter of which is incorporated herein by reference.

TECHNICAL FIELD

The disclosed embodiments relate generally to wireless communication systems, and, more particularly, to contention-based transmission in wireless Orthogonal Frequency Division Multiplexing (OFDM) systems.

BACKGROUND

In wireless systems such as orthogonal frequency division multiplexing (OFDM) or orthogonal frequency division multiple access (OFDMA) wireless systems, contention-based uplink transmission is commonly used for multiple user equipments (UEs) to transmit uplink data to a serving base station (eNB) via a shared uplink channel. For example, a UE may request access and acquire ownership of an uplink access channel to initiate transmission with its serving eNB via an access request procedure such as initial ranging, handover ranging, bandwidth request (BW-REQ) ranging, or random access procedure (RACH). Typically, a contention-based access request procedure consists two phases: a first contention resolution phase and a second request negotiation phase.

FIG. 1 (Prior Art) illustrates a sequence chart of a 5-step BW-REQ ranging procedure used in IEEE 802.16e wireless systems. In the first phase of contention resolution, a UE sends a preamble (e.g., a BW-REQ ranging code) via a shared channel (step 1), and an eNB acknowledges after detecting which UE sends the BW-REQ ranging code (step 2). In the second phase of request negotiation, the UE sends a BW-REQ message for bandwidth allocation (step 3), and the eNB grants uplink resource after correctly decoding the BW-REQ message (step 4). After successful contention and negotiation in both phases, the UE is then able to start scheduled uplink transmission (step 5). Therefore, the request-and-grant mechanism takes five steps and thus is quite time-consuming to complete the entire BW-REQ ranging procedure.

FIG. 2 (Prior Art) illustrates a message sequence chart of a 3-step BW-REQ ranging procedure and a fallback 5-step BW-REQ ranging procedure used in IEEE 802.16m wireless systems. In a 3-step BW-REQ ranging procedure illustrated in the left side of FIG. 2, the UE first sends a BW-REQ ranging code with an embedded BW-REQ message (step 1). The eNB detects the BW-REQ ranging code, decodes the BW-REQ message, and grants uplink resource accordingly (step 2). The UE then starts scheduled uplink data transmission after receiving the UL grant (step 3). By sending the BW-REQ ranging code and the BW-REQ message together, BW-REQ ranging latency is shortened. This 3-step BW-REQ ranging procedure, however, still requires the UE to send the ranging code and ranging message before the scheduled uplink data transmission.

Furthermore, the 3-step BW-REQ ranging procedure falls back to a 5-step BW-REQ ranging procedure when ranging collision occurs. As illustrated in the right side of FIG. 2, the UE first sends a BW-REQ ranging code with an embedded BW-REQ message (step 1). Due to multiple ranging transmission from multiple user equipments (i.e., multiple user equipments send bandwidth requests with different BW-REQ ranging codes and ranging messages at the same time), the BW-REQ messages may not be decodable by the eNB while the BW-REQ ranging codes are decodable (step 2). This is because BW-REQ ranging code is usually more robust than BW-REQ message in the BW-REQ ranging design. As a result, the UE retransmits the BW-REQ message to the eNB (step 3). The eNB decodes the BW-REQ message successfully and grants uplink resource (step 4). Finally, the UE is able to start scheduled uplink data transmission (step 5). Therefore, in the fallback 5-step BW-REQ ranging procedure, access latency is not reduced.

SUMMARY

A method for contention-based (CB) uplink transmission in a wireless communication network is provided. A base station (eNB) first transmits CB configuration information and CB grant to a user equipment (UE). The UE derives a plurality of transmission opportunities from the uplink CB grant and in response transmits uplink CB data via one of the transmission opportunities. The UE then receives an acknowledgment from the serving base station. If the uplink CB data is non-decodable by the eNB due to multiple contention UEs, then the UE retransmits the uplink data in response to a negative acknowledgment. In one novel aspect, the uplink transmission radio resource carriers both the uplink CB data and UE-selected signature information. By eliminating a separate phase of contention resolution, the overall latency of CB transmission is reduced and transmission efficiency is improved.

To improve detection performance, at the receive side, the eNB may allocate multiple orthogonal CB transmission opportunities to be shared among the contention UEs; eNB may increase the number of receive antennas to provide more degrees-of-freedom for CB data detection; and the eNB may also create multiple CB groups to reduce collision rate. At the transmit side, the UE may apply FDM or CDM for orthogonal resource utilization for pilot tones that carry UE-selected signature information; the UE may select proper precoding to create spatial domain diversity gain; and the UE may also use the most conservative modulation and coding scheme (MCS) to improve system robustness.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
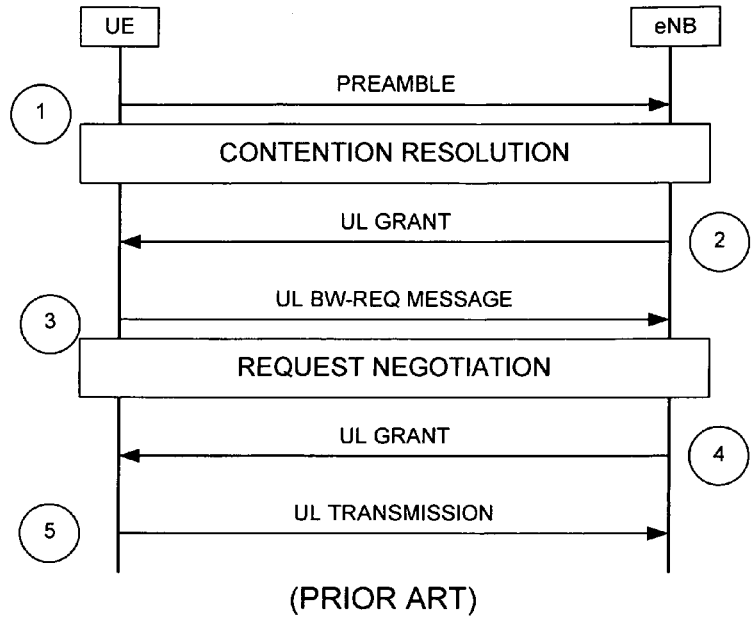
FIG. 1 (Prior Art) illustrates a sequence chart of a 5-step BW-REQ ranging procedure.
Figure 2:
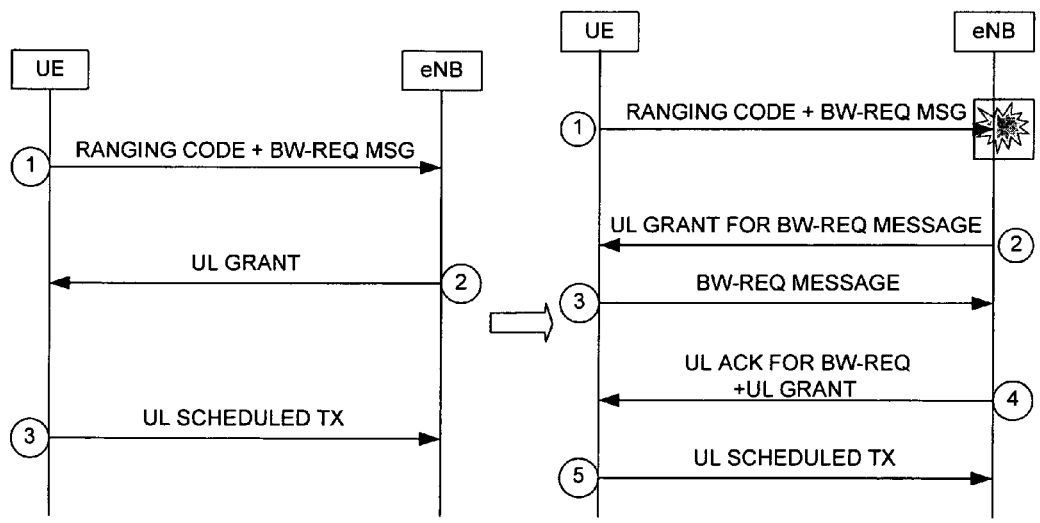
FIG. 2 (Prior Art) illustrates a sequence chart of a 3-step BW-REQ ranging procedure and a fallback 5-step BW-REQ ranging procedure.
Figure 3:
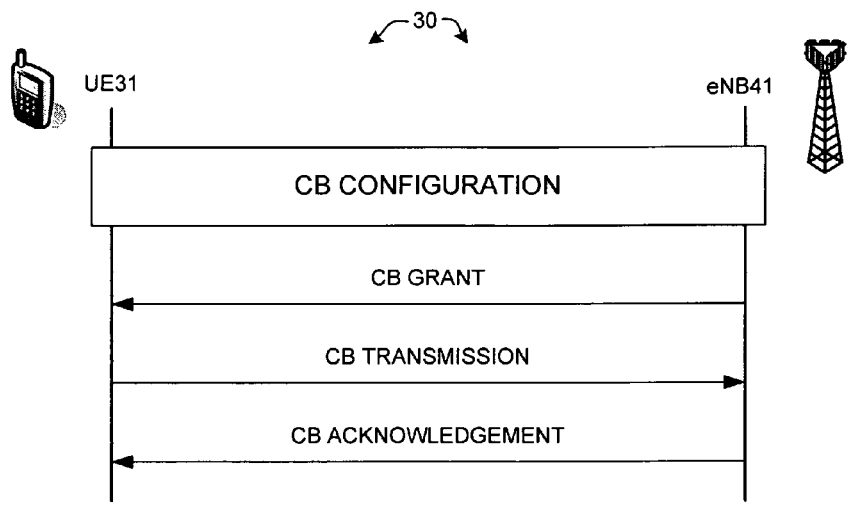
FIG. 3 illustrates a method of contention-based uplink transmission in a wireless communication network in accordance with one novel aspect.

FIG. 3 illustrates a method of contention-based uplink transmission in a wireless Orthogonal Frequency Division Multiple Access (OFDMA) network 30 in accordance with one novel aspect. Wireless network 30 comprises a plurality of user equipments (e.g., including UE31) and a serving base station eNB41. To initiate a contention-based (CB) transmission, each UE needs to be configured beforehand via a CB configuration phase. During the CB configuration phase, eNB41 transmits CB configuration information to the plurality of UEs. In addition, eNB41 also transmits uplink CB grants to the UEs. After the CB configuration phase, the UEs start uplink CB transmission via allocated transmission opportunities. Upon receiving the CB transmission, eNB41 detects the uplink data for each UE and transmits corresponding CB acknowledgments back to each UE based on the detection result.

In one novel aspect, the contention-based uplink transmission scheme eliminates a separate preamble transmission step from the UEs to the eNB before the step of uplink CB transmission. In a traditional CB uplink transmission procedure, each UE needs to first transmit a preamble (e.g., a code sequence that uniquely identifies the UE) to the eNB such that the eNB can identify the UE and then acknowledge its contention request. In the novel CB uplink transmission procedure, however, the preamble is a "UE-selected signature", which is transmitted to the eNB in the uplink data. By eliminating the separate preamble transmission step, the overall latency of the entire CB transmission procedure is reduced. In one embodiment of the CB uplink transmission procedure, each UE transmits uplink CB data into OFDM symbols where the UE-selected signature is embedded into pilot tones and CB data are carried by data tones.

Due to the nature of contention-based uplink transmission, it is likely that multiple UEs may transmit uplink data to the eNB simultaneously. If collision occurs, then contention resolution mechanism is required. In addition, retransmission control is required if the collided data is non-decodable by the eNB. Therefore, to facilitate the novel contention-based uplink transmission scheme, it is desirable to improve detection performance by the eNB such that transmission latency can be largely reduced. It is also desirable to enhance the CB transmission protocol to handle inevitable data detection failure such that overall transmission efficiency can be improved. Different methods for improving detection performance and enhancing the CB transmission protocol are now described below in more details.

Improving Detection Performance in CB Transmission

Figure 4:
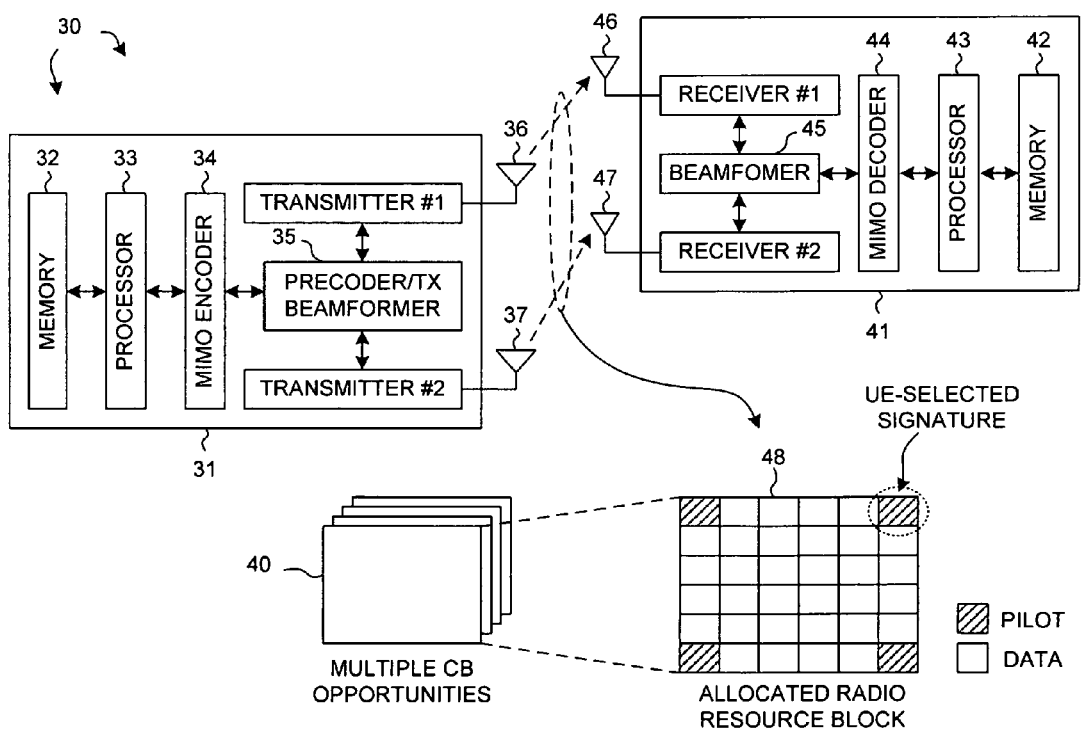
FIG. 4 is a simplified block diagram of a UE and an eNB in contention-based uplink transmission in accordance with one novel aspect.

FIG. 4 is a simplified block diagram of UE31 and eNB41 in wireless OFDMA network 30 for contention-based uplink transmission in accordance with one novel aspect. On the transmit side, UE31 comprises memory 32, a processor 33, a multiple-input multiple-output (MIMO) encoder 34, a precoding/beamforming module 35, a first transmitter #1 coupled to antenna 36, and a second transmitter #2 coupled to antenna 37. On the receive side, eNB41 comprises memory 42, a processor 43, a MIMO decoder 44, a beamforming module 45, a first receiver #1 coupled to antenna 46, and a second receiver #2 coupled to antenna 47.

When uplink data is transmitted from multiple contention UEs and received by the eNB, better detection performance may be achieved from both the transmit side and the receive side. In OFDMA systems, data is transmitted via allocated radio resource blocks, and each resource block consists of pilot tones and data tones. Pilot tones carry UE-selected signature and are periodically inserted in the resource blocks to facilitate channel response estimation for the decoding of data tones. Therefore, from the transmitter perspective, with proper separation of orthogonal resources over pilot tones, the space-domain signatures of each contention UE can be obtained to resolve contention. Moreover, UE precoding can provide additional domain to enhance data decoding performance. On the other hand, CB uplink transmission opportunities (e.g., radio resource blocks) are allocated by the eNB via CB grants. Therefore, from the receiver perspective, more granted CB transmission opportunities can decrease possible collision rate because different opportunities are orthogonal to each other and separated over time-frequency domain. In addition, more receive antennas can provide more spatial-domain degrees-of-freedom to mitigate/suppress interference and to detect multiple contention UEs.

In the example of FIG. 4, multiple CB transmission opportunities 40 granted by eNB41 are shared among a group of UEs including UE31 for CB uplink transmission. UE31 selects one of the CB transmission opportunities (e.g., radio resource block 48) to transmit CB uplink data. Within radio resource block 48, pilot tones are inserted in certain location (e.g., denoted by slashed shade) for channel estimation for the decoding of data tones (e.g., denoted by white shade). The pilot tones carry UE-selected signature code sequence, and orthogonal resource utilization for the pilot tones ensures good channel estimation to obtain the UE signature and to decode the data tones. Multiple transmit antennas (e.g., 36-37) and receive antennas (e.g., 46-47) are equipped by UE31 and eNB41 such that various MIMO precoding/beamforming schemes can be applied to detect more than two contention UEs with limited number of radio resources and to allow the system to operate under low signal to interference plus noise ratio (SINR) cell region.

Figure 5:
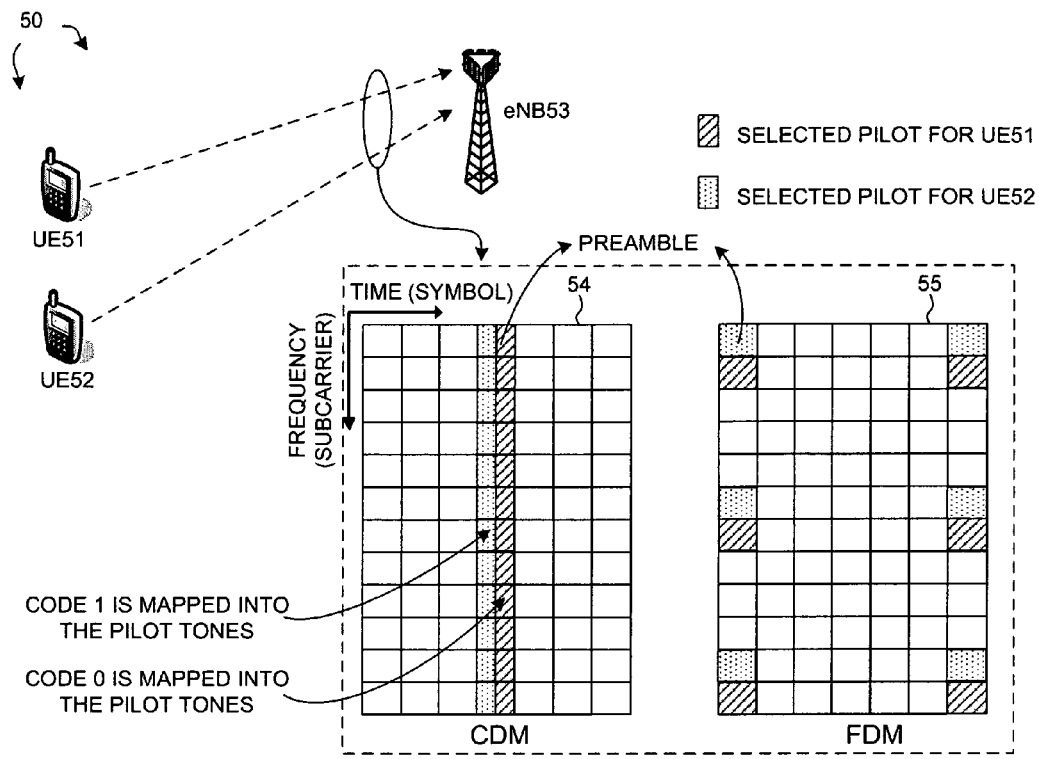
FIG. 5 illustrates pilot tones and data tones allocated in a radio resource block in contention-based uplink transmission.

FIG. 5 illustrates pilot tones and data tones allocated in radio resource blocks for contention-based uplink transmission in a wireless OFDMA network 50. In OFDMA systems, transmission opportunities are two-dimensional radio resource blocks comprising a number of consecutive sub-carriers (frequency tones) and a number of consecutive OFDM symbols (time slots). In the example of FIG. 5, UE51 and UE52 are contention UEs that simultaneously transmit uplink CB data to eNB53 via multiple CB transmission opportunities allocated by eNB53. For example, radio resource blocks 54 and 55 are orthogonal opportunities that are separated over time-frequency domain. Because multiple contention UEs share the orthogonal opportunities for uplink CB data transmission, more opportunities typically decrease possible collision rate. However, because there are only a limited number of orthogonal radio resources, there is still a high probability for multiple contention UEs to utilize the same radio resource block for CB transmission.

When multiple UEs use the same radio resource block for uplink CB data transmission, ensuring orthogonal resource utilization for pilot tones becomes critical. This is because if there is collision in pilot tones, then there is no chance to decode data tones correctly. There are two basic schemes to allocate orthogonal radio resources for pilot tones among multiple contention UEs. The first scheme is called frequency division multiplexing (FDM), where pilot tones are separated into several exclusive subcarrier sets. As illustrated by resource block 55 in FIG. 5, UE51 utilizes one subcarrier set (denoted by slashed shade), while UE52 utilizes another subcarrier set (denoted by dotted shade) for CB transmission. The second scheme is called code division multiplexing (CDM), where each cell is allocated with several orthogonal code sequences for pilot tones and each UE utilizes one code sequence over pilot tones for CB transmission. As illustrated by resource block 54 in FIG. 5, code0 is mapped into pilot tones by UE51 (denoted by slashed shade), while code1 is mapped into pilot tones by UE52 (denoted by dotted shade).

The key to resolve contention UEs is to identify each UE's spatial-domain signature (e.g., preambles), which is mapped into the pilot tones by each UE. In one embodiment, each UE selects the preamble according to a function associated with UEID. For example, Preamble Code=func (UEID). Thus, the preamble code carriers "UE-selected signature" information. In another embodiment, a UE randomly selects the preamble. The randomly selected preamble code can still be used to represent the UE as long as there is no code collision. In the latter case, the UE ID is carried in the CB data, instead. Therefore, with proper orthogonal resource separation over pilot tones among different UEs, good channel estimation can be achieved and the data from different UEs can be decoded with high correction rate. Each UE's spatial-domain signature carried by the pilot tones can be obtained, and the data tones are still decodable even though contention occurs. That is, with orthogonal resource utilization for pilot tones, data collision is not necessarily equivalent to data detection failure.

In addition to proper pilot tone allocation, uplink transmission precoding is another way to improve detection performance. Uplink transmission precoding creates additional spatial domain to separate simultaneous signal transmission over the same time-frequency resource. If each UE properly selects its own precoder, then the interference among different UEs can be mitigated. Each UE can select precoder based on purely random criteria, or based on estimated uplink channel information. The precoder can be selected from a codebook, or a subset of a codebook that consists of nearly orthogonal precoders. In general, more uplink transmission antennas proved better performance. Likewise, more receive antennas provide more degrees-of-freedom to detect contention UEs. With multiple transmit and receive antennas, various MIMO schemes can be applied to improve performance.

Figure 6:
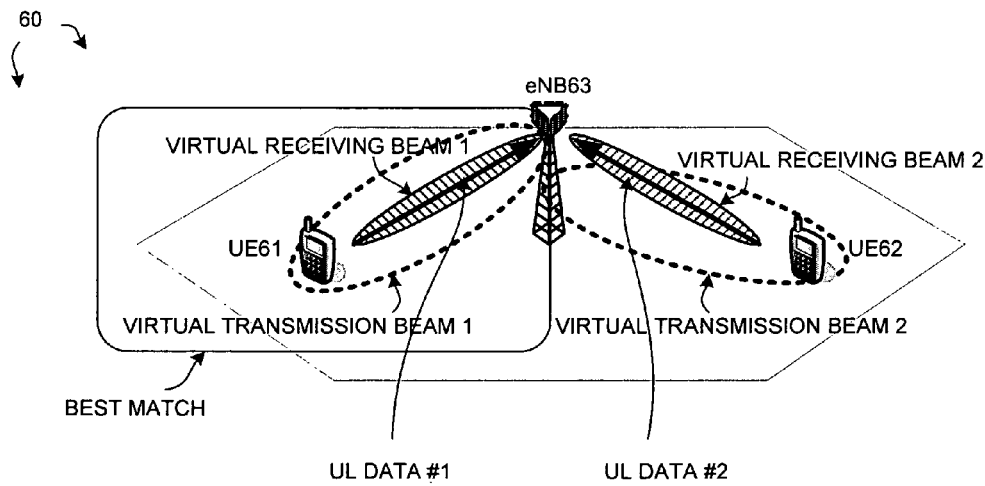
FIG. 6 illustrates a MIMO precoding/beamforming scheme used in contention-based uplink transmission.

FIG. 6 illustrates a MIMO precoding/beamforming scheme used in contention-based uplink transmission. Precoding/beamforming is a signal processing technique that leverages arrays of transmitting and receiving antennas for directional signal transmission and reception. In the example of FIG. 6, a signal carrying UL data #1 or #2 is applied with appropriate weighting at the transmit side for each transmitting antenna of UE61 or UE62 such that the signal power is maximized at the receiver side. When transmitting the signal, UE61 or UE62 performs transmit beamforming (i.e., by creating virtual transmission beams #1 and #2), and thus increases the power in the direction the signal is to be sent. When receiving the signal, eNB63 performs receive beamforming (i.e., by matching virtual receiving beams #1 and #2 with virtual transmission beams #1 and #2), and thus increase the receiver sensitivity in the direction of the desired signals and decrease the sensitivity in the direction of interference and noise. Therefore, by applying precoding/beamforming at both transmit side and receive side utilizing multiple transmitting and receiving antennas, there is increased opportunity for eNB63 to achieve beamforming gain and find a best match. In the example of FIG. 6, virtual receiving beam #1 and virtual transmission beam #1 form the best match for eNB63 to decode UL data #1.

To further improve decoding performance, each UE may use a conservative modulation and coding scheme (MCS) to enhance system robustness. For example, Quadrature Phase-Shift Keying (QPSK) modulation as well as coding schemes with 1/32 low code rate may be used. Repetition code could also be used to improve power gain. The selection of MCS may be predefined, or may be configurable based on system performance requirement.

Different CB schemes have been simulated to verify CB transmission performance. One embodiment of applying the CB scheme is to configure the DM-RS signal for each UE by dedicated RRC signaling. Each UE uses different DM-RS signals to differentiate themselves in the overlapped pilot tones. Another embodiment of applying the CB scheme is to configure a pool of DM-RS signals for a group of UE by broadcasting or RRC configuration. Each UE selects one out of the DM-RS signal pool. It is verified that for DM-RS collision case (e.g., two contending UEs simultaneously transmit data in the same resource blocks and choose the same cyclic shift value), both UE data is non-decodable. On the other hand, for DM-RS collision free case (e.g., two contending UEs simultaneously transmit data in the same resource block and choose different cyclic shift values), both UE data is decodable. At PER=1%, both UEs are in the SINR range from 2 to 2.5 dB. When the number of receive antennas increases from two to four, 1.5 to 2.5 dB SINR improvements are achieved for the two UEs.

Enhancing CB Transmission Protocol

While detection performance can be improved via various techniques applied by both the UE and the eNB in CB transmission, uplink CB data detection failure is still inevitable due to the nature of contention-based transmission from multiple contention UEs. An enhanced CB transmission protocol and a lightweight contention resolution scheme are thus desirable to further improve CB transmission performance and to handle uplink CB data detection failure.

Figure 7:
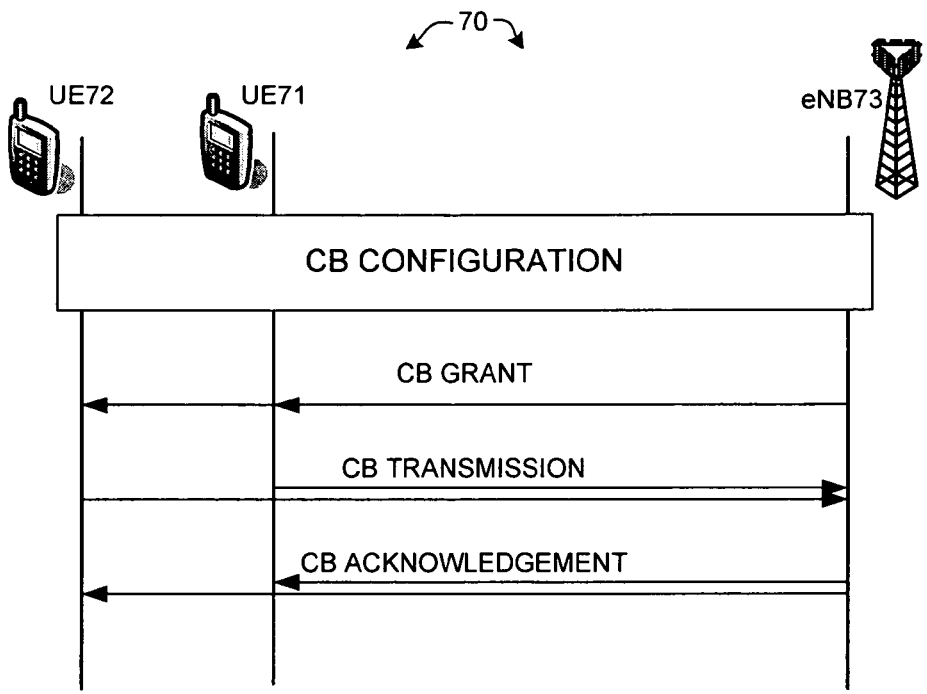
FIG. 7 illustrates a sequence chart of one embodiment in contention-based uplink transmission in a wireless network.

FIG. 7 illustrates a message sequence chart of one embodiment in contention-based uplink transmission in a wireless communication network 70. Wireless network 70 comprises a plurality of user equipments (e.g., including UE71 and UE72) and a serving base station eNB73. To initiate a contention-based (CB) transmission, each UE needs to be configured beforehand via a CB configuration phase. During the CB configuration phase, eNB73 transmits CB configuration information and an uplink CB grant to UE71 and UE72. Typically, the CB configuration information comprises general parameters for uplink CB transmission, while the CB grant allocates the actual CB transmission opportunities. After the CB configuration phase, UE71 and UE72 start uplink CB transmission via allocated CB transmission opportunities. Upon receiving uplink CB transmission, eNB73 detects the uplink data for each UE and transmits corresponding CB acknowledgments back to each UE based on the detection result.

CB configuration information and CB grant may be transmitted either via a broadcast channel or via radio resource control (RRC) signaling. In general, a broadcast channel requires low signaling overhead but may need paging mechanism to update configuration change, while RRC signaling provides high configuration flexibility but also requires high configuration overhead via unicasting. In a first embodiment, the CB configuration information is transmitted via a downlink share channel that broadcasts the configuration information (e.g. contained in the system information block (SIB)), and the CB grant is transmitted via a downlink control channel (e.g., the packet data control channel (PDCCH)). In a second embodiment, the CB grant is transmitted via a downlink share channel that broadcasts the grant information, and the CB activation is transmitted via a downlink control channel (e.g., the PDCCH). For example, CB transmission may be activated via a separate PDCCH message after the CB grant. In a third embodiment, the CB configuration information and the CB grant are transmitted via a downlink share channel that broadcasts the configuration and the grant information, and the CB activation is transmitted via a downlink control channel (e.g., the PDCCH).

The actual content and parameters contained in the CB configuration information may include a CB radio network temporary identifier (CB-RNTI), a modulation and coding scheme (MCS), a CB group identity, CB resource allocation information for subframe allocation, and contention resolution parameters such as backoff parameter for re-transmission. When granting radio resource for CB transmission, the eNB scrambles the CB grant using the CB-RNTI, and each UE de-scrambles the CB grant using the same CB-RNTI. Multiple CB grants can be allocated by one allocation message via a single PDCCH. In a first embodiment, a fixed-size allocation scheme is used, where the transmission block (TB) size of each CB transmission is fixed. As a result, each UE can implicitly derive the CB transmission opportunities. For example, if six resource blocks (RBs) are allocated in a PDCCH and the TB size is two, then there are exactly three CB transmission opportunities granted. In a second embodiment, a variable-size allocation scheme is used, where the TB size of each CB transmission varies. The TB size can be a parameter embedded in the PDCCH. With the total grant size and the TB size information embedded in the PDCCH, each UE can derive the CB transmission opportunities.

When the number of contention UEs increases, data collision rate also increases if the granted transmission opportunities remain the same. To reduce collision rate, it is possible for the eNB to group a large number of UEs into several smaller CB groups, and allocated certain amount of radio resource to each CB group. In one embodiment, the eNB uses implicit grouping via existing RRC parameters. For example, the implicit grouping may be randomly performed, or based on dedicated scheduling request (D-SR) parameter, or based on transmission TB size. In another embodiment, the eNB uses explicit grouping based on pre-configuration via either broadcasting or dedicated RRC signaling.

Once a UE is configured and granted for uplink CB transmission, the UE can transmit uplink data in contention-based physical uplink shared channel (CB-PUSCH), based on PDCCH. If multiple CB opportunities are found, then the UE can randomly choose any one of the CB opportunities to transmit uplink data. In addition, there is no closed-loop power control for CB transmission. The transmit power of the UE is typically determined by open-loop power control. In a first example, the UE reuses the transmit power of the last successful random access preamble. In a second example, the UE calculates the transmit power based on the downlink reference measurement to compensate for channel loss.

In response to the received uplink data, CB acknowledgment is then transmitted by the eNB back to the UEs. Various communication channels may be used to transmit the CB acknowledgment. In a first embodiment of CB acknowledgment, a physical hybrid ARQ (HARQ) indicator channel (PHICH) is used to transmit the CB acknowledgment. Under this method, HARQ feedback L1 signaling can be reused as acknowledgment. However, if multiple UEs collide, then the existing 1-bit information in PHICH is not enough to inform the collision because no UE ID information is contained in the feedback signaling. This HARD-like L1 signaling method can be improved by using a new PHICH design. The new PHICH carriers UE ID related information to identify multiple UE collisions. For example, the position information in the new PHICH may be derived by UE ID, C-RNTI, CB ID, IMEI, IMSI, etc. using a hash function such that each UE can obtain the acknowledgment in the derived position in the new PHICH.

In a second embodiment of CB acknowledgment, a grant-based acknowledgment via PDCCH is used to transmit the CB acknowledgment. In this method, if a CB-PUSCH is correctly decoded, then the eNB sends a CB grant as an acknowledgment. However, if no unicasting grant is received by the UE, then the CB transmission is considered as failed. In one example, the PDCCH is masked by C-RNTI based on UE ID or other new format (e.g., grant, ack, UE included). In another example, the PDCCH is masked by CB-(ACK)-RNTI based on new format that includes multiple UE IDs. In a third embodiment of CB acknowledgment, a MAC control element (MAC CE) is used to transmit the CB acknowledgment. The MAC CE is masked by CB-(ACK)-RNTI or C-RNTI. It is possible to aggregate multiple CB acknowledgments together in one MAC CE, although with increased signaling overhead.

The transmit timing for the CB acknowledgment may be configured differently. In one example, a fixed time (e.g., 4 sub-frames after the receiving of the uplink data) is applied for CB acknowledgment transmission. This method is more likely to be applied in the first embodiment (e.g., PHICH) of CB acknowledgment. In another example, a batch of CB acknowledgments is transmitted together within a short window after the receiving of the uplink data. This method is likely to be applied in the third embodiment (e.g., MAC CE) of CB acknowledgment.

Figure 8:
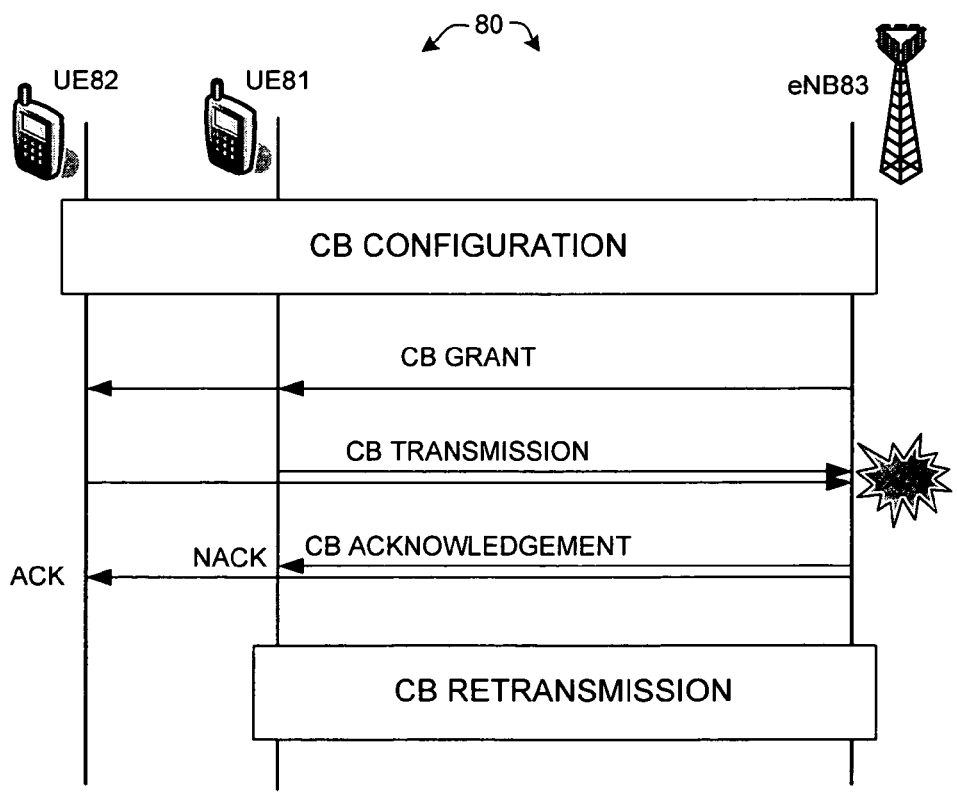
FIG. 8 illustrates a sequence chart of one embodiment in contention-based uplink transmission with retransmission in a wireless network.

FIG. 8 illustrates a message sequence chart of contention-based uplink transmission with re-transmission in a wireless communication network 80. Wireless network 80 comprises a plurality of user equipments (e.g., including UE81 and UE82) and a serving base station eNB83. As illustrated in FIG. 8, UE81 and UE82 transmit uplink CB data to eNB83 simultaneously. Although data collision occurs, eNB83 is able to decode the uplink data from UE82 and in response sends a positive acknowledgment (ACK) back to UE82. However, eNB83 is not able to decode the uplink data from UE81 and in response sends a negative acknowledgment (NACK) back to UE81. Upon receiving the NACK, UE81 performs CB retransmission and retransmits the uplink data to eNB83.

In one embodiment of CB retransmission, RLC-based transmission mechanism is used without applying HARQ-like retransmission. The MAC layer simply discards the CB data after uplink CB transmission, and the re-transmitted CB data is generated from the RLC layer. In another embodiment of CB retransmission, the MAC layer keeps the CB data and tries to retransmit if necessary. The CB retransmission is performed only on CB grant for the kept CB data. The timing for the next CB transmission may be random backoff. Alternatively, no backoff time is applied, and the eNB allocates more CB opportunities if detection failure occurred. The UE should give up CB transmission and fall back to random access channel (RACH) procedure if CB-PUSCH has failed for a number of retires.

Figure 9:
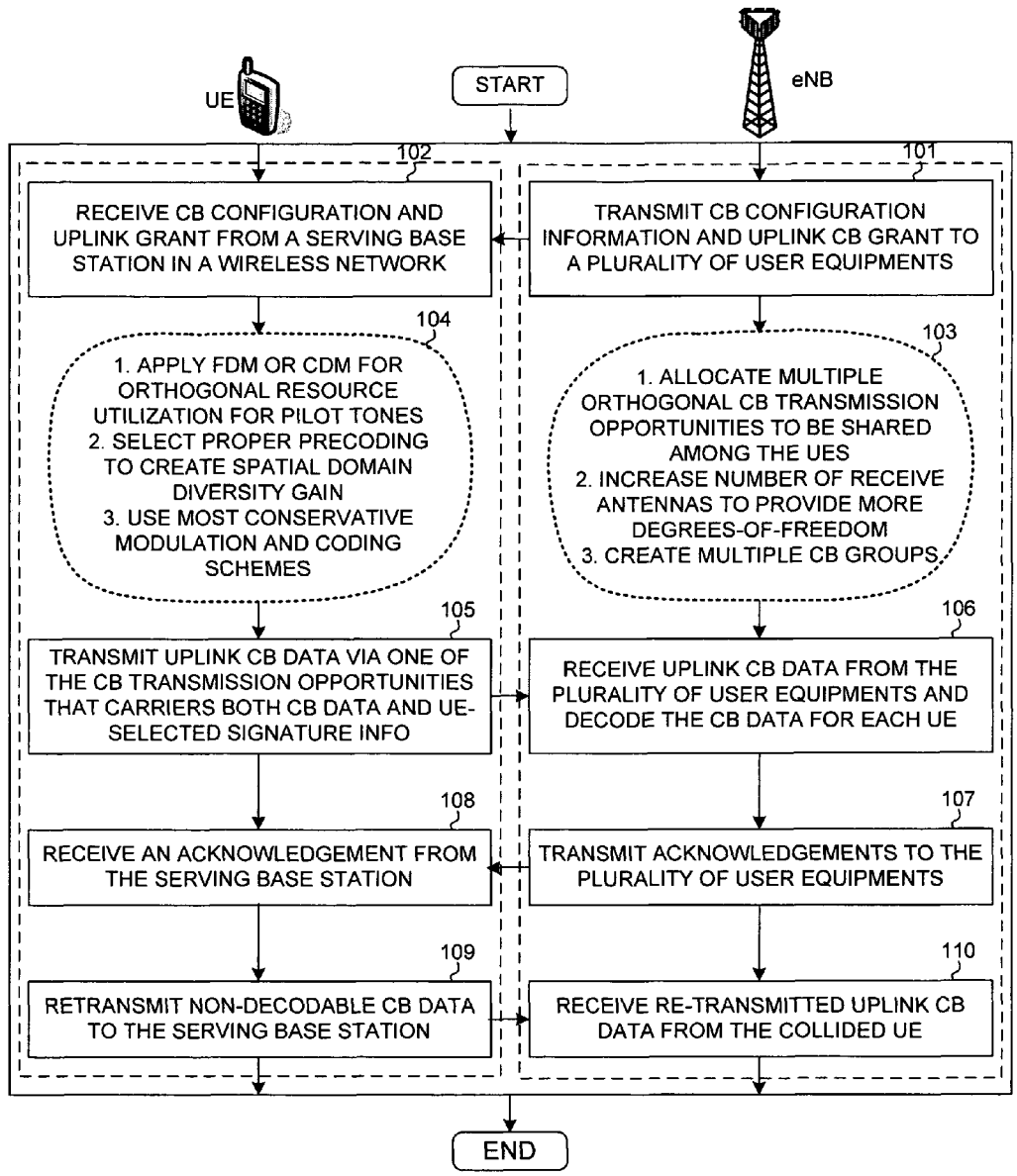
FIG. 9 is a flow chart of a method of contention-based uplink transmission between a UE and its serving eNB in accordance with one novel aspect.

FIG. 9 is a flow chart of a method of contention-based uplink transmission between a UE91 and its serving eNB92 in accordance with one novel aspect. To initiate CB uplink transmission, eNB92 transmits (step 101) CB configuration information and uplink grant to a plurality of UEs including UE91. UE91 receives (step 102) the CB configuration information and uplink grant from the eNB. Various techniques may be applied at the transmit side and the receive side to improve CB data detection performance. At the receive side (step 103), eNB92 may allocate multiple orthogonal CB transmission opportunities to be shared among the plurality of UEs; eNB92 may increase the number of receive antennas to provide more degrees-of-freedom for data detection; and eNB92 may create multiple CB groups to reduce collision rate. At the transmit side (step 104), UE91 may apply FDM or CDM for orthogonal resource utilization for pilot tones that carrier UE-selected signature information; UE91 may select proper precoding to create spatial domain diversity gain; and UE91 may use the most conservative modulation and coding scheme to improve system robustness.

Once uplink CB transmission has been configured and granted, UE91 transmits uplink CB data via one of the allocated CB transmission opportunities (step 105), and eNB92 receives uplink CB data from the plurality of UEs and decodes the CB data for each UE (step 106). Based on the detection result, eNB92 transmits positive acknowledgement (ACK) or negative acknowledgement (NACK) back to the UEs (step 107). Upon receiving (step 108) the ACK or NACK, UE91 retransmits the uplink CB data to eNB92 (step 109). Finally, eNB92 successfully receives and decodes the retransmitted CB data.

Figure 10:
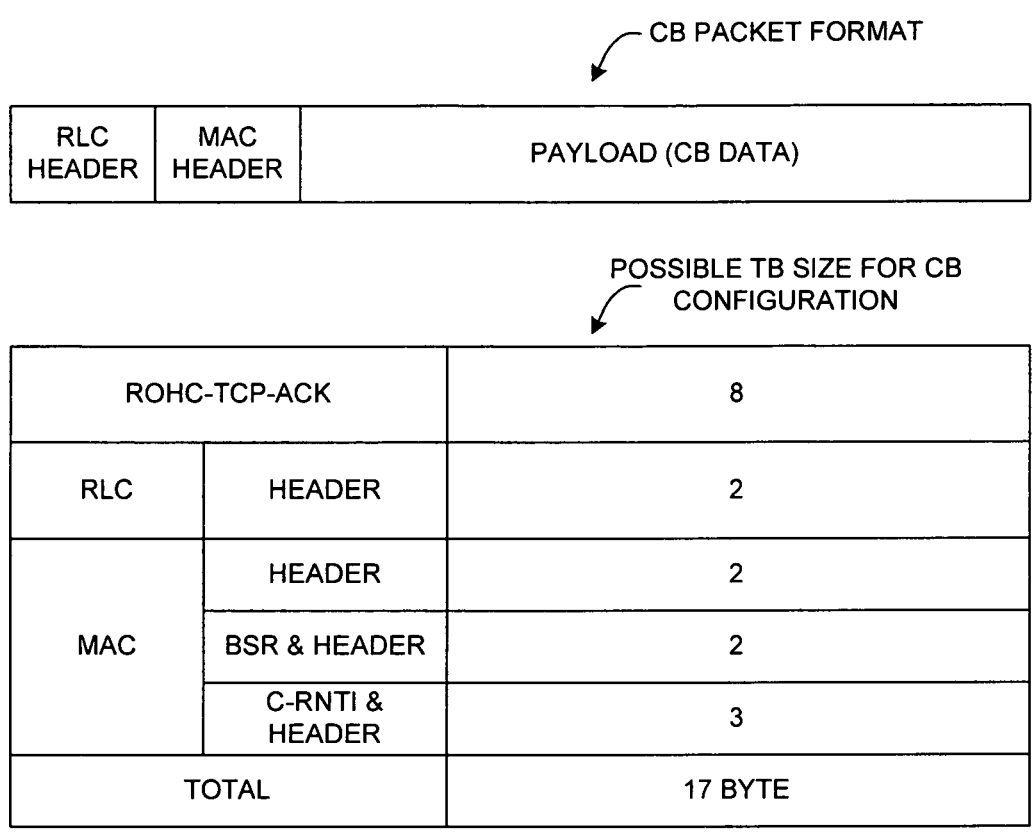
FIG. 10 illustrates a CB packet format for applying CB mechanism in 3GPP LTE/LTE-A systems.

FIG. 10 illustrates a CB packet format for applying CB mechanism in 3GPP LTE/LTE-A systems. In the example of FIG. 10, the uplink CB data format contains RLC header, MAC header and payload. The RLC header is used to carry robust header compression (ROHC) information for packet compression; MAC header is used to carry MAC layer control information optionally including buffer status reporting (BSR) and C-RNTI; and the payload is used to carry uplink CB data. A possible TB size for CB configuration is also illustrated in FIG. 10.

The proposed uplink CB transmission may be applied and integrated into wireless communication systems with other features. In a first example, in multi-carrier systems, if multiple CB-PUSCH grants are provided on more than one component carrier (CC) at the same transmission time interval (TTI), then the UE may randomly choose one (or more) to transmit its CB data. In a second example, to cooperate with scheduling request (SR) mechanism, CB transmission is either allowed only when SR is triggered, or independent to SR. When CB transmission happens, the UE can either cancel triggered SR or allow triggered SR to continue. In a third example, CB transmission cooperates with on-going HARQ retransmission. For a TTI, if a retransmission is scheduled and CB opportunity exists, then the UE can perform simultaneous transmission, or gives retransmission higher priority without simultaneously using CB resource and normal resource in the same TTI. In a fourth example, to cooperate with TTI bundling mechanism, the bundling activated UE shall not use CB resource. Alternatively, the bundling activated UE can use CB resource, but CB transmission is not bundled. In the future, the proposed uplink CB transmission methods may be applied in smart phone applications to improve power consumption and latency performance. It may also be applied in applications aim to optimize short-packet transmission such as Machine Type Communication (MTC) or Machine to Machine (M2M) communication.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for contention-based (CB) uplink transmission in a wireless communication network, the method comprising:
   receiving, by a user equipment (UE), CB configuration information and an uplink CB grant from a serving base station in the wireless communication network, wherein the uplink CB grant is received before transmitting UE-selected signature information;
   deriving a plurality of transmission opportunities from the uplink CB grant and in response transmitting uplink CB data via radio resource blocks of an uplink data channel correspond to one of the transmission opportunities, wherein the radio resource blocks carry both the uplink CB data and the UE-selected signature information, wherein the uplink CB data is carried by data tones and the UE-selected signature information is embedded into pilots tones of the same radio resource blocks, and wherein the UE-selected signature information contains a preamble of UE identity information that is mapped into the pilot tones for eliminating a separate preamble transmission; and
   receiving an acknowledgment from the serving base station.

2. The method of claim 1, wherein the UE signature information is transmitted via pilot tones in an OFDM network, and wherein the UE utilizes an exclusive subcarrier set for pilot tone transmission.

3. The method of claim 1, wherein the UE signature information is transmitted via pilot tones in an OFDM network, and wherein the UE utilizes one of a plurality of orthogonal code sequences for pilot tone transmission.

4. The method of claim 1, wherein the CB configuration information contains multiple precoders that are selected from a codebook, and wherein the user equipment utilizes one of the multiple precoders for uplink transmission.

5. The method of claim 1, wherein the UE utilizes either a pre-defined or a configurable modulation and coding scheme to improve system robustness.

6. The method of claim 1, wherein the plurality of transmission opportunities contains orthogonal time-frequency radio resource regions for CB transmission in an OFDM network.

7. The method of claim 1, wherein the UE uses open-loop power control to determine the uplink transmission power.

8. The method of claim 1, further comprising:
   re-transmitting the uplink CB data if the UE receives a negative acknowledgment from the serving base station.

9. The method of claim 8, wherein the CB data is discarded by the media access control (MAC) layer after uplink CB transmission, and wherein the re-transmitted CB data is generated from radio link control (RLC) layer.

10. The method of claim 8, wherein the CB data is kept by the media access control (MAC) layer, and wherein the re-transmission is performed only on CB grant for the kept CB data.

11. A method for contention-based (CB) uplink transmission in a wireless communication network, the method comprising:
- transmitting, by a serving base station, CB configuration information and an uplink CB grant to a plurality of user equipments (UEs) in the wireless communication network, wherein the uplink CB grant is transmitted before receiving preambles of UE identity information from the user equipments;
- receiving uplink CB data from the plurality of user equipments, wherein the uplink CB data is transmitted via radio resource blocks of an uplink data channel allocated based on the uplink grant;
- obtaining UE-selected signature information embedded in pilot tones of the radio resource blocks, wherein the UE-selected signature information contains preambles of UE identity information for decoding the received uplink CB data carried in data tones of the same radio resource blocks for corresponding UEs without receiving separate preamble transmission from the user equipments; and
- transmitting acknowledgments to the plurality of user equipments.

12. The method of claim 11, wherein the CB configuration information comprises at least one of a CB radio network temporary identifier (RNTI), a modulation and coding scheme, a CB group identity, CB resource allocation, and a backoff parameter for re-transmission.

13. The method of claim 11, wherein the CB configuration information is transmitted via a downlink share channel, and wherein the CB grant is transmitted via a downlink control channel.

14. The method of claim 11, wherein the CB grant is transmitted via a downlink share channel, and wherein CB activation is transmitted via a downlink control channel.

15. The method of claim 11, wherein the CB configuration information and CB grant are transmitted via a downlink share channel, and wherein CB activation is transmitted via a downlink control channel.

16. The method of claim 11, wherein the serving base station implicitly groups the plurality of user equipments based on existing radio resource control (RRC) parameter.

17. The method of claim 11, wherein the serving base station explicitly groups the plurality of user equipments based on pre-configuration via either broadcasting or dedicated radio resource control (RRC) signaling.

18. The method of claim 11, wherein the acknowledgment is transmitted via a physical hybrid ARQ indicator channel (PHICH), and wherein position information in the PHICH is derived from UE signature information.

19. The method of claim 11, wherein the acknowledgment is transmitted via a packet data control channel (PDCCH) or a media access control (MAC) control element (CE).

20. The method of claim 11, wherein the serving base station uses multiple receiving antennas to receive the uplink CB data.

21. A user equipment (UE) comprising:
- a receiver that receives contention-based (CB) configuration information and an uplink CB grant from a serving base station before transmitting a preamble to the serving base station, wherein the uplink CB grant allocates a plurality of CB transmission opportunities to be shared among a group of user equipments in a wireless OFDMA network; and
- a transmitter that transmits uplink CB data via uplink radio resource blocks of an uplink data channel correspond to one of the CB transmission opportunities, wherein the uplink radio resource blocks carry both the uplink CB data and the preamble embedded with UE-selected signature information for UE identification, wherein the uplink CB data is carried by data tones and the UE-selected signature information is embedded into pilots tones of the same uplink radio resource blocks, and wherein the preamble is mapped into the pilot tones for eliminating a separate preamble transmission from the UE.

22. The UE of claim 21, wherein the UE signature information is transmitted via pilot tones, and wherein the UE utilizes an exclusive subcarrier set for pilot tone transmission.

23. The UE of claim 21, wherein the UE signature information is transmitted via pilot tones, and wherein the UE utilizes one of a plurality of orthogonal code sequences for pilot tone transmission.

* * * * *